(12) United States Patent
Santoni et al.

(10) Patent No.: US 11,345,064 B2
(45) Date of Patent: May 31, 2022

(54) HOLLOW PART MANUFACTURE

(71) Applicants: McLaren Automotive Limited, Surrey (GB); The University of Sheffield, Yorkshire (GB)

(72) Inventors: Claudio Santoni, Surrey (GB); Elaine Arnold, Rotherham (GB); Timothy Swait, Rotherham (GB); Mark Laycock, Rotherham (GB)

(73) Assignees: McLaren Automotive Limited, Woking (GB); The University of Sheffield, Sheffield (GB)

( * ) Notice: Subject to any disclaimer, the term of this patent is extended or adjusted under 35 U.S.C. 154(b) by 280 days.

(21) Appl. No.: 16/606,649

(22) PCT Filed: Apr. 20, 2018

(86) PCT No.: PCT/GB2018/051047
§ 371 (c)(1),
(2) Date: Oct. 18, 2019

(87) PCT Pub. No.: WO2018/193269
PCT Pub. Date: Oct. 25, 2018

(65) Prior Publication Data
US 2020/0047375 A1    Feb. 13, 2020

(30) Foreign Application Priority Data

Apr. 21, 2017  (GB) ..................................... 1706392

(51) Int. Cl.
  *B29C 33/48*  (2006.01)
  *B29C 70/48*  (2006.01)
(Continued)

(52) U.S. Cl.
  CPC ............ *B29C 33/485* (2013.01); *B29C 70/44* (2013.01); *B29C 70/48* (2013.01); *B29C 33/52* (2013.01)

(58) Field of Classification Search
  CPC ...................................................... B29C 33/485
  See application file for complete search history.

(56) References Cited

U.S. PATENT DOCUMENTS 5,564,447 A * 10/1996 Niedermair ............. B29C 33/52
                                                      134/11
5,624,618 A *  4/1997 Forman ................. B29C 33/301
                                                      264/103

(Continued)

FOREIGN PATENT DOCUMENTS

CN      105946247 A     9/2016
EP        2772416       6/2015

(Continued)

OTHER PUBLICATIONS

Examination Report for corresponding GB 1706392.6, dated Aug. 2, 2019, 3 pages.

(Continued)

*Primary Examiner* — Galen H Hauth
(74) *Attorney, Agent, or Firm* — Fish & Richardson P.C.

(57) ABSTRACT

A method for removing a hollow support element (17) from within a moulded part (15) to form a cavity (25) within the moulded part, the hollow support element being disposed within the moulded part and composed of material having a softening temperature, the method comprising: heating a liquid (20) to a temperature at least equal to the softening temperature of the material; injecting the heated liquid into an opening (24) in the moulded part to deform the material; and removing deformed material and liquid from the cavity.

21 Claims, 3 Drawing Sheets

(51) Int. Cl.
B29C 70/44 (2006.01)
B29C 33/52 (2006.01)

(56) References Cited

U.S. PATENT DOCUMENTS

| | | | | |
|---|---|---|---|---|
| 6,340,509 | B1 * | 1/2002 | Nelson | B29C 33/40 428/34.7 |
| 2009/0212467 | A1 | 8/2009 | Nahmias et al. | |

FOREIGN PATENT DOCUMENTS

| | | |
|---|---|---|
| GB | 2542662 | 3/2017 |
| JP | H02-263610 A | 10/1990 |
| JP | H09-323365 A | 12/1997 |
| JP | H10-217296 A | 8/1998 |
| JP | H11-77700 | 3/1999 |
| WO | WO 98/47682 A1 | 10/1998 |

OTHER PUBLICATIONS

Examination Report for corresponding GB 1706392.6, dated Sep. 13, 2017, 4 pages.
International Search Report and Written Opinion for corresponding PCT/GB2018/051047, dated Jul. 18, 2018, 13 pages.
International Preliminary Report on Patentability in PCT/GB2018/051047, dated Oct. 22, 2019, 6 pages.

* cited by examiner

HOLLOW PART MANUFACTURE

This invention relates to a method for the removal of support elements used in the manufacture of hollow fibre-reinforced parts.

It is known to manufacture components from fibre-reinforced composite (FRC) materials. Such materials typically comprise a matrix that contains reinforcing fibres. As an example, the matrix could be an epoxy resin and the fibres could be carbon fibre (CF) strands. Materials of this type can have good strength in comparison to their weight. However, the processes required to make components from fibre-reinforced materials can be complex.

One process for forming FRC components is resin transfer moulding (RTM). In this process the reinforcing fibres are laid up in a mould cavity, liquid resin is injected into the mould cavity and the resin is cured, typically by heating the mould body. Once the resin has become solid the mould can be opened and the resulting component removed. The resin can be injected by drawing a vacuum in the mould cavity and allowing the vacuum to pull the resin into the mould. The mould cavity can be defined by rigid mould tools, which has the advantage of giving good control over the dimensional accuracy and surface finish of the component. Furthermore, long fibre runs, and woven mats of fibres can be embedded in the matrix, giving the end component great strength. RTM can be used for major structural components, such as vehicle tubs, as described in EP 2 772 416.

RTM can be used to manufacture hollow components when used in combination with a support element such as an inflatable bladder. Such an element may be made of a material such as a rubber and may be inflated prior to moulding, such that the fibres can be laid up around it. The support element may have an intrinsic rigidity and may be inflated during moulding to counteract the pressure of the resin injection. The support element can be left inside the hollow cavity of the moulded part after moulding is completed. However, this adds weight to the part, which is undesirable if the part is to be used in applications where very lightweight parts are required.

Alternatively, the support element, such as the bladder, can be removed once moulding is completed to reduce the weight of the part. If the hollow cavity of the moulded part is fully enclosed, this requires an opening to be left or made in the part through which the bladder can be removed. It is desirable for the opening to be as small as possible, so as not to affect the strength of the finished part.

In traditional processes, the support element, such as the bladder, may be removed in one piece by deflating it and pulling it through the opening in the part. However, this requires the opening to be sufficiently large to pull the complete deflated bladder through it, which can reduce the strength of the part. If the bladder is made from a polymer such as Polyethylene, pulling the bladder out of the part mechanically might be difficult at ambient temperature due to the rigidity of the bladder. It may also be difficult to remove even if heated up due to the heating weakening the bladder substantially and thus rendering the bladder subject to breakage when pulled.

It is possible to use a support element that is made from a dissolvable material, such as polyvinyl acetate (PVA) that is removed by injecting a liquid into the support element to dissolve it once moulding is completed. A smaller opening is required to remove a support element that has been fully or partially dissolved in a liquid, as this reduces the volume of material which must pass through the opening at one time. However, this limits the materials that the support element can be made from. Many dissolvable materials do not have sufficient strength to support the carbon fibres mats and resin used in processes such as RTM.

It is therefore desirable for there to be an improved method of removing a support element from a moulded part through an opening in the moulded part.

According to one aspect of the invention there is provided a method for removing a hollow support element from within a moulded part to form a cavity within the moulded part, the hollow support element comprising an internal cavity, the hollow support element being disposed within the moulded part and composed of material having a softening temperature, the method comprising: heating a liquid to a temperature at least equal to the softening temperature of the material; injecting the heated liquid into an opening in the moulded part to deform the material; and removing deformed material and liquid from the cavity.

According to a second aspect of the invention there is provided a method for removing a hollow support element from within a moulded part to form a cavity within the moulded part, the hollow support element being disposed within the moulded part and composed of material having a softening temperature, the method comprising: heating a liquid to a temperature at least equal to the softening temperature of the material; injecting the heated liquid into an opening in the moulded part to deform the material; and removing deformed material and liquid from the cavity.

The support element may comprise an internal cavity. Injecting the heated liquid into the opening in the moulded part may comprise injecting the heated liquid into the internal cavity of the support element through the opening in the moulded part.

Injecting the heated liquid into the opening in the moulded part may comprise injecting the heated liquid into the opening such that the heated liquid infiltrates the space between the support element and the moulded part.

Removing the deformed material and liquid from the moulded part may comprise removing the deformed material and liquid from the moulded part through the opening.

Deforming the material may comprise softening the material.

The support element may be composed of material having a melting temperature. The liquid may be heated to a temperature at least equal to the melting temperature of the material. The liquid may be injected into the opening in the moulded part to melt the material.

Injecting the heated liquid into the opening in the moulded part may comprise injecting the heated liquid into the opening in the moulded part to fully melt the support element.

The method may further comprise mechanically agitating the support element and the heated liquid inside the moulded part.

The liquid may be polyethylene glycol.

The liquid may be polypropylene glycol.

The liquid may be a mixture of two or more liquids.

The method may comprise mixing the heated liquid with a gas prior to injecting the heated liquid into the opening in the moulded part.

The mixing of the heated liquid with a gas may form an aerated heated liquid. The aerated heated liquid may be injected into the opening in the moulded part.

The material composing the support element may comprise two or more material constituents.

The material composing the support element may comprise a rubber.

The support element may be an inflatable bladder.

Removing deformed material and liquid from moulded part may comprise removing substantially all of the deformed material and liquid.

Injecting the heated liquid and removing the deformed material and liquid may form the cavity of the moulded part.

The method may comprise attaching a fluid supply line to the opening of the moulded part. Injecting the heated liquid may be via the fluid supply line.

Attaching the fluid supply line to the opening of the moulded part may seal the opening of the moulded part. Removing the melted material and liquid may comprise detaching the fluid supply line to the opening of the moulded part.

Injecting the heated liquid into the opening in the moulded part may comprise partially or fully immersing the moulded part in a bath of liquid to allow heated liquid to flow into the opening.

The method may comprise orientating the moulded part so that the melted material and liquid can flow from the cavity.

The method may comprise introducing a suction line to the opening. Removing the deformed material and liquid may comprise using the suction line to suck the deformed material and liquid from the cavity of the moulded part.

The method may comprise, prior to injecting the heated liquid into an opening in the moulded part, heating the moulded part to a temperature at least equal to the softening temperature of the material to deform the material.

Heating the moulded part may comprise introducing heated air through the opening in the moulded part.

The moulded part may be composed of material having a glass transition temperature. The liquid may be heated to a temperature at least equal to the glass transition temperature of the material of the moulded part.

The material of the moulded part may comprise cured matrix material. The glass transition temperature may be the glass transition temperature of the cured matrix material.

The present invention will now be described by way of example with reference to the accompanying drawings.

The following description is presented to enable any person skilled in the art to make and use the invention, and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The present invention relates to a method for removing a hollow support element from within a moulded part to form a cavity within the moulded part. The hollow support element may be disposed within the moulded part. The hollow support element may extend from within the moulded part to outside the moulded part. The hollow support element may extend from within the moulded part to outside the moulded part via an opening in the moulded part. The hollow support element may be composed of material having a softening temperature and a melting temperature. The method comprises heating a liquid to a temperature at least equal to the softening temperature of the material. The method further comprises injecting the heated liquid into an opening in the moulded part to deform the material. The heated liquid is injected at the temperature to which it has been heated. The method further comprises removing deformed material and liquid from the moulded part to form the cavity. The method may comprise heating the liquid to a temperature above the softening temperature of the material but below the melting temperature of the material. The method may comprise heating the liquid to a temperature at least equal to the melting temperatures of the material and comprise injecting the heated liquid into an opening in the moulded part to melt the material. The method may further comprise removing melted material and liquid from the moulded part to form the cavity. Deforming the material may include softening the material. Deforming the material may include melting the material.

Figure 1:
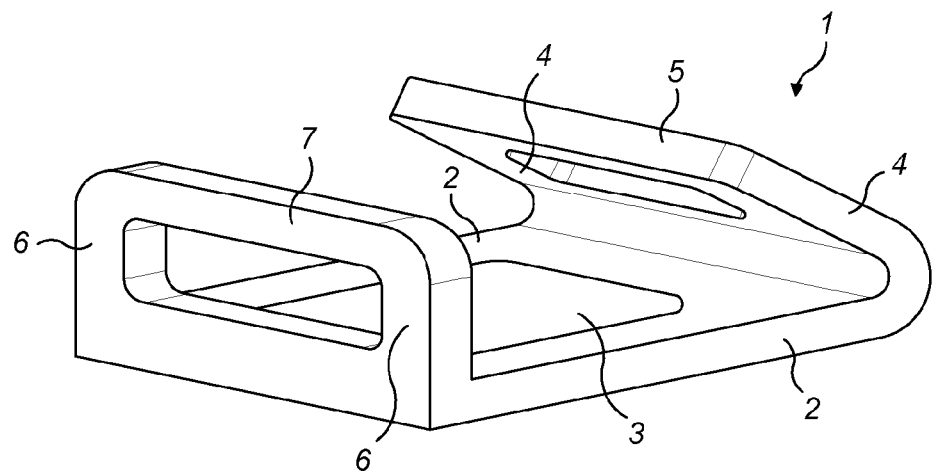
FIG. 1 shows an example of a vehicle tub manufactured by resin transfer moulding.

FIG. 1 shows an example of a carbon fibre reinforced part formed by resin transfer moulding. A vehicle tub 1 has a frame comprising side sills 2 which run along the sides of the tub. A floor 3 extends between the sills. At the front of the tub frame A-pillars 4 rise from the sills. The upper ends of the A-pillars are joined by a cross-member 5. At the rear of the tub frame C-pillars 6 rise from the sills. The C-pillars are joined by a cross-member 7. The sills, pillars and cross-members are formed as hollow tubes. This can be achieved by inflating a bladder, or other support element, within each tube during the RTM process. Inflation could occur by means of a gas or liquid being injected into the support element. Alternatively, the support element may be rigidized by filling it with a medium, such as a granulated material, and applying a vacuum so that the skin of the support element conforms to the medium. The RTM process involves laying up long fibre reinforcement in a mould, injecting a matrix precursor into the mould, curing the matrix precursor to form a rigid matrix around the reinforcing fibres and removing the resulting component from the mould. The RTM mould defines the exterior shape of the RTM component.

The walls forming the tub frame are formed of rigid, cured epoxy in which are embedded long runs of carbon fibre. The fibre could be in the form of tow, mats or individual fibres. The mean length of the fibres in the walls could be greater than 25 mm or more preferably greater than 50 cm. The fibres are laid up in a way that strengthens the tub frame against the stresses expected to be imposed on it in use. Typically, most parts of the walls will contain multiple layers of reinforcing fibre. In each tubular element of the tub frame the fibres may run generally longitudinally and/or generally circumferentially. Fibres running generally circumferentially are known as hoop fibres.

Figure 2:
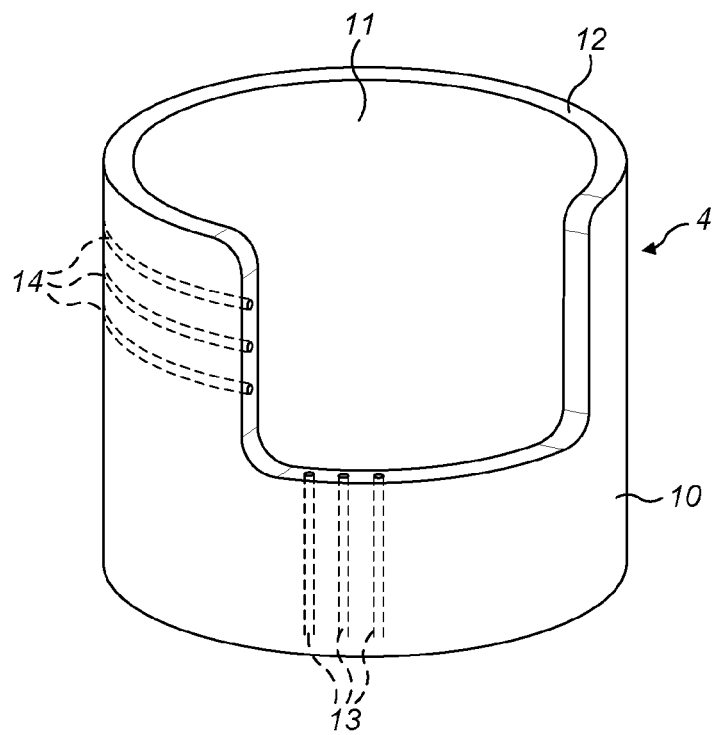
FIG. 2 shows a cross-section through a part of a hollow A-pillar of the tub of FIG. 1.

FIG. 2 shows a cut-away view of an A-pillar 4 of the tub frame. The A-pillar is in the form of a tube having an outer surface 10 and a hollow interior 11. The wall of the tube is formed of a matrix material indicated at 12. Longitudinal fibres are indicated at 13, and hoop fibres are indicated at 14. These tubular elements can be formed by laying up the fibres around at least one support element, putting the fibres together with the support element(s) into a mould, injecting matrix precursor into the mould and curing the matrix precursor to form a rigid matrix around the reinforcing fibres and removing the resulting moulded part from the mould. The support element(s) may be reinforced during the injection process to stop the support elements collapsing under the pressure of the injection. Such reinforcement may be by inflating the support elements and/or by maintaining the increased pressure inside the support element during the injection process. Alternatively, the support element may be reinforced by filling it with an incompressible fluid or a granulated material tightly packed inside the support element. As discussed herein the support element may be an inflatable bladder and thus an increased pressure may be induced and maintained inside the bladder, for example by inflating the bladder with a fluid. i.e. filling the bladder with air, or by filling the bladder with water.

Alternative methods may be used to form the moulded part. For example, it could be formed by laying up mats of reinforcing fibre that have been pre-impregnated with resin (prepreg) and then curing the resin. Support element(s) can be used in the forming process in a similar way to form the moulded part.

Figure 3:
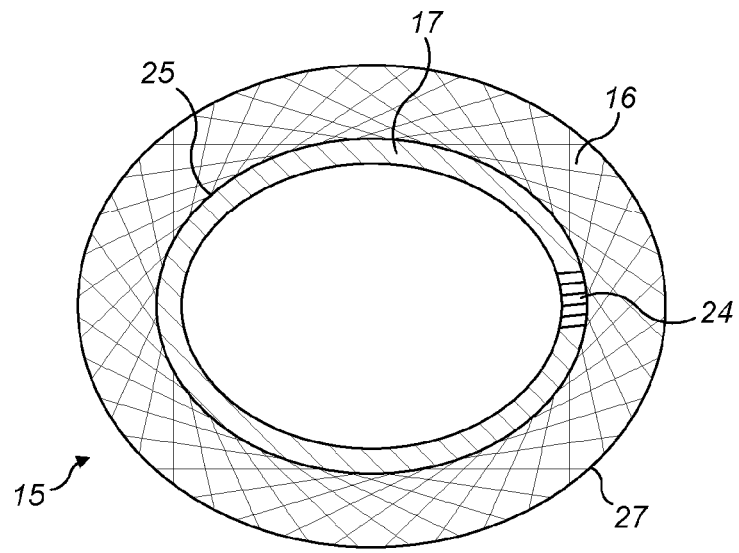
FIG. 3 shows a cut through of a hollow moulded part containing a support element.

FIG. 3 shows another example of a moulded part 15, that may be fabricated by RTM or another moulding method. FIG. 3 shows part of the exterior surface of the moulded part 15 removed so that the interior of the moulded part 15 can be shown and described. It will be appreciated that the exterior surface of the moulded part 15 may continue over the cut through region.

As pictured in FIG. 3, the moulded part 15 may be a carbon fibre moulded part. The moulded part 15 comprises an outer surface 27 and a hollow interior 25. Thus, the surface of the moulded part 15 defines a cavity 25 therewithin. In the part shown in FIG. 3, the hollow cavity 25 is completely enclosed. In FIG. 3, the hollow cavity 25 is shown as being filled by a support element 17 which is used in the forming process of the moulded part 15.

The support element 17 is used to form the cavity 25. In order to fabricate the moulded part 15, in one method reinforcing fibres 16 may be laid up around the support element 17 before a mould is closed around the support element 17 and reinforcing fibres 16 and resin is injected into the gap between the mould and the support element containing the fibres. In one example, the support element 17 is an inflatable bladder.

The support element may be hollow and may be inflated with air prior to laying up the fibres around it, before closing the mould and injecting the resin. The support element may have at least some inherent rigidity which means that it can be used as a forming tool by laying up the fibres around it without requiring inflation. The interior of the support element 17 may be pressurised during the process of closing the mould around it and injecting the resin. E.g. the support element 17 may be inflated. The support element 17 may extend to the exterior of the moulded part 15.

The support element 17 may have an inflation aperture 24 through which the support element is inflated. The inflation aperture 24 may remain in place during the moulding process. The inflation aperture 24 may be a valve that can be controlled to permit the ingress and egress of fluid from the interior of the support element 17. The inflation aperture may protrude through an opening in the moulded part 15, and thus in certain embodiments the carbon fibre layers. Alternatively, the inflation aperture 24 may be covered by the fibres during the layup process, with the entire surface area of the support element 17 being laid up with fibres.

After moulding is completed, it is desirable to remove the support element 17 from the hollow cavity of the finished part. Thus, for example, reducing the weight of the final moulded part. Methods for removing the support element 17 will now be described with reference to FIGS. 4A, 4B and 5.

Figure 4A:
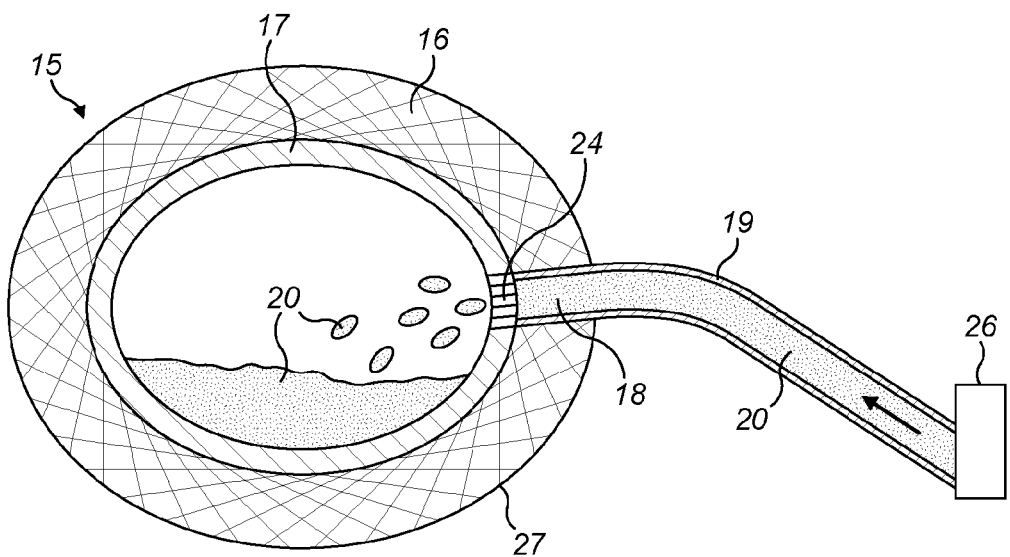
FIGS. 4A, 4B and 5 show cut throughs of a hollow moulded part and illustrate methods for the removal of the support element after moulding.
Figure 4B:
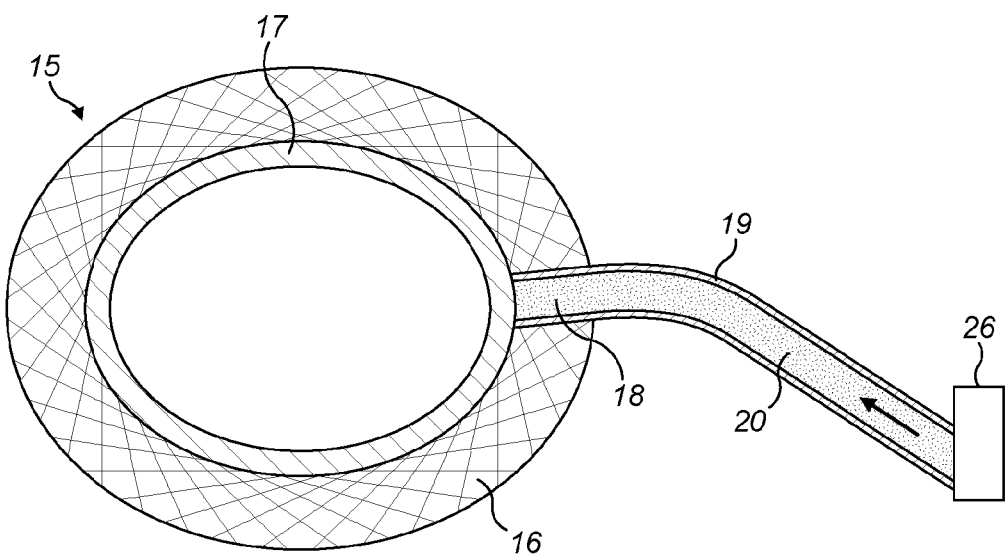

FIGS. 4A and 4B shows a moulded part 15 that is undergoing the process of removal of the support element 17 contained within the moulded part's cavity 25. In these processes a liquid 20 is used to remove the support element 17 from within the moulded part 15 to thus form the cavity within the moulded part 15. The liquid 20 is used to wash out the material of the support element 17 from inside the moulded part 15. The processes typically involve the steps of heating a liquid to a temperature that means the liquid is capable of deforming the support element by softening or even melting the material composing the support element, injecting the heated liquid into the moulded part to deform the material of the support element, and removing the deformed material and liquid to form the cavity 25 inside the moulded part 15.

The method may comprise providing a moulded part. This moulded part may be fabricated according to any suitable method described herein or any related alternative method. The moulded part has a support element disposed within it, the support element being composed of material having a softening temperature and a melting temperature. The material composing the support element may be deformed by it being fully or partially softened and/or fully or partially melted.

The outer surface 27 of the moulded part 15 defines an opening 18. Thus, the moulded part 15 comprises an opening 18. Preferably, the outer surface 27 of the moulded part 15 contains only a single opening 18. The opening 18 may be formed by inserting a spacer tool prior to moulding which the carbon fibre is laid up around. Alternatively, the opening may be formed around the inflation aperture 24 through which an inflation tube is inserted for inflating the bladder. Alternatively, although less preferably due to the risk of weakening the part 15, the opening may be made after moulding, for example by drilling a hole through the finished part into the hollow cavity of the part 15.

Attached to the opening 18 is a supply line 19 for delivering a liquid 20 to the interior, and thus the cavity, of the moulded part 15, which contains the support element 17. Thus, the method may comprise attaching a supply line 19 to the moulded part. The supply line 19 being configured to deliver a liquid 20 to the interior of the moulded part 15.

If the support element 17 is hollow, the liquid 20 may be introduced into the internal cavity of the support element, as shown in FIG. 4A. This may be done by injecting the liquid through the opening in the moulded part and then through the inflation aperture 24 used to inflate the support element 17.

Alternatively, the liquid 20 may be injected into the interior of the support element 17 through an opening 18 in the moulded part and then through an opening formed in the bladder after moulding has been completed. This may be the case if the inflation aperture 24 was removed, or covered, prior to moulding and the support element 17 was laid up with fibres fully covering the support element 17. In this case, the opening in the moulded part may be formed after moulding is completed.

As shown in FIG. 4B, the liquid 20 may also be injected through the opening in the moulded part and deposited onto the external surface of the support element 17, between the support element and the moulded part, as shown in FIG. 4B, rather than being injected into the interior of a hollow support element 17. FIG. 4B shows the liquid starting to soften the support element 17. The liquid may then contact the exterior surface of the support element 17 and start the removal process by the liquid interacting with this exterior of the support element 17. The liquid may infiltrate the space between the external surface of the support element 17 and the interior of the moulded part. This could be achieved by collapsing the hollow support element by applying a vacuum prior to injecting the heated liquid. A partial amount of liquid could be injected between the support element and the moulded part, whilst the remainder is injected into the internal cavity of the support element. Alternatively, all of the heated liquid could be injected between the support element and the moulded part. The support element 17 may also be solid, non-hollow support element in this case. Alternatively, if the support element is hollow, all of the liquid could be injected into the internal cavity of the support element, as shown in FIG. 4A.

In another embodiment, the liquid may be injected into the part by fully or partially immersing the part in a bath of the heated liquid, such that the liquid is able to flow into the opening in the moulded part once the part is immersed.

In any case, the support element 17 of the present invention is made from material that can be deformed by the liquid injected into the moulded part. This occurs by heating the liquid to a temperature that means the liquid 20 is capable of softening or melting the support element without softening or even melting the moulded part 15. The liquid may be heated by liquid heater 26. The softening point of the material constituting the support element 17 is the temperature at which a material softens beyond some arbitrary softness. It can be determined, for example, by the Vicat method (ASTM-D1525 or ISO 306), Heat Deflection Test (ASTM-D648) or a ring and ball method (ISO 4625 or ASTM E28-67/E28-99 or ASTM D36 or ASTM D6493-11). The melting point of the material constituting the support element 17 is the temperature at which the material undergoes a phase transformation from a solid into a liquid. Thus, for a given atmospheric pressure around the support element 17, the material constituting the support element 17 has a melting temperature associated with it which is the temperature as which the material reaches its melting point. The support element 17 may be made from a single material or from material comprising a mixture of two or more material components. The support element could be made from a layered multi-material construction. At least some of the layers may have a different softing or melting temperature. Each layer may even have a different softening or melting temperature.

Examples of materials from which the bladder may be constructed include:
Thermoplastic elastomers
Polyethylene
Polypropylene
PVA
Rubber
Nylon The liquid has a boiling point that is at least greater than the softening temperature of the bladder material. The liquid may have a boiling point that is greater than the melting temperature of the bladder material. The boiling point is the temperature, for a given atmospheric pressure, at which the liquid undergoes a phase transformation from a liquid to a gas.

The liquid is heated prior to injecting it into the part. Thus, in one embodiment, the removal method comprises heating the liquid to a temperature at least equal to the softening temperature of the support element material. The liquid may be heated to a temperature equal to or greater than the softening temperature of the bladder material. The liquid may be heated to a temperature greater than the softening temperature of the bladder material. Preferably, the liquid is heated to a temperature 5° C., 10° C., 15° C., 20° C. or more higher than the softening temperature of the support element material. Preferably, the liquid may be heated to a temperature at least equal to or greater than the softening point of the support element material but to a temperature less than the softening point of the material that forms moulded part 15. The liquid may be heated to a temperature at least equal to or greater than the softening point of the support element but less than the melting point of the support element.

In another embodiment, the liquid may be heated to a temperature equal to or greater than the melting temperature of the bladder material. The liquid may be heated to a temperature greater than the melting temperature of the bladder material. Preferably, the liquid is heated to a temperature 5° C., 10° C., 15° C., 20° C. or more higher than the melting temperature of the support element material. Preferably, the liquid may be heated to a temperature greater than the melting point of the support element material but to a temperature less than the softening point of the material that forms moulded part 15.

The temperature to which the liquid is heated may be substantially less than the melting point, softening point and/or glass transition temperature of the material that forms the moulded part 15 so that the moulded part 15 is not thermally deformed by the injection of the liquid.

During the process of removing the support element from the part, it is advantageous for the part to be heated to a temperature that is in excess of the glass transition temperature of the material composing the moulded part, but less than the softening temperature of the material composing the part. Within this temperature range, the part may undergo a post-curing process by increasing the degree of crosslinking within the resin, which improves the strength of the part. Thus, the liquid may be heated to a temperature above the glass transition temperature of the material that forms the moulded part 15 but less than the softening temperature of the material that forms the moulded part 15.

If the bladder material has a softening or melting temperature, as appropriate, of less than 100° C., the liquid may be water. If the bladder material has a softening or melting temperature, as appropriate, greater than 100° C., a liquid with a higher boiling point may be used, such as polyethylene glycol (PEG) or polypropylene glycol (PPG). The liquid may be a solution or a solvent comprising more than one element combined together.

Polyethylene glycol is a polyether compound. PEG is also known as polyethylene oxide (PEO) or polyoxyethylene (POE), depending on its molecular weight. The structure of PEG is commonly expressed as H—(O—CH$_2$—CH$_2$)$_n$—OH. PEG, PEO and POE refer to an oligomer or polymer of ethylene oxide. PEG and PEO are liquids or low-melting point solids, depending on their molecular weights. PEGs are prepared by polymerization of ethylene oxide and are commercially available over a wide range of molecular weights from 300 g/mol to 10,000,000 g/mol. PEG is soluble in water, methanol, ethanol, acetonitrile, benzene and dichloromethane. Therefore, a solution of PEG may be formed with any of the liquids and injected into the moulded part 15. PEG, or a solution of PEG, typically has a boiling point of 200° C. and so can be used to melt the material of support elements that have a melting point up to about 150° C.

The liquid injected into the part may be a mixture of two or more different liquids. The two or more liquids may each have different boiling temperatures.

Upon contact with the support element material after being injected, the heated liquid, which has been heated to a temperature at least equal to the softening temperature of the support element material, deforms the material by causing it to soften. Alternatively, if the heated liquid has been heated to a temperature at least equal to the melting temperature of the support element material, the heated liquid deforms the support element material such that it undergoes a phase transformation from a solid to a liquid. Preferably, the whole support element is softened or melted. However, the support element may be partially softened or melted, for instance when the interior surface of the moulded part is such that it is difficult to distribute the heated liquid to all parts of the interior of the moulded part. It will be appreciated that the melting of the support element material using a liquid that is at a temperature at or above the melting temperature of the support element material is distinguished from the dissolving of the support element material by the liquid being a solvent of the support element material. The dissolving of material involves the suspension of solid, not fluid, elements of material within the solvent rather than the transitioning of the material to a fluid state by transference of heat energy to the material. Therefore, the injected liquid may soften and/or melt the support element without dissolving the support element.

Once the support element 17 has fully or partially deformed by softening or melting the material comprising the support element, the deformed material that previously made up the support element 17 is removed from the interior of the moulded part along with injected liquid used to deform the bladder. Preferably, a substantial proportion, if not all, of the injected liquid and deformed material is removed from the interior of the moulded part. This deformation and removal forms the cavity within the moulded part by removing the support element that was present in the cavity prior to removal. The support element material may be removed as more heated liquid is injected into the moulded part. If the material has been deformed by melting, the moulded part may be orientated during injection of the liquid so that the melted support element material can flow out of the moulded part during injection. This flow may be due to the effect of gravity on the material/liquid mixture. The support element material may be removed after the injection of the heated material is complete. The support element material may be removed by replacing the injection line 19 with a suction line which is connected to a pump to suck the deformed support element out of the opening 18 in the moulded part 15. Alternatively, the suction line may be connected to a different opening in the moulded part than that used to inject the heated liquid.

Preferably, the mixture of the melted support element material and the heated liquid are removed from the part by flowing out through the same opening through which the liquid was injected. Preferably, the moulded part is completely emptied of all deformed bladder material and liquid.

By supplying the heated liquid and removing the liquid/support element material mixture through the same small opening, the strength of the part is not reduced by requiring additional holes to be made in the part.

Alternatively, the mixture of deformed support element material and heated liquid may be removed from the part through a different opening to the opening through which it entered the part.

The deformation of the support element may be assisted by spraying the hot liquid onto/into the bladder at high pressure. This may be done using a high pressure spraying nozzle inserted into the opening.

To further assist support element removal, the liquid entering the interior of the moulded part through the opening may be mixed with gas. Mixing the liquid with a gas results in a frothy foamed liquid. The result may be an aerated liquid that thus contains bubbles of the gas. This has been found to assist the melting of the bladder material. The liquid may be mixed with gas as the liquid is injected into the moulded part. The liquid may be mixed with gas prior to the liquid being injected into the moulded part. The gas may be air. Alternatively, the gas may be another gas such as argon or nitrogen or a mixture of gases. In a preferred embodiment; the gas is air.

The aeration of the liquid may be achieved by passing gas through the liquid by means of a Venturi tube, aeration turbines or compressed gas which can be combined with diffuser(s), air stone(s), as well as fine bubble diffusers, coarse bubble diffusers or linear aeration tubing. Diffusers or spargers can also be designed into the system to cause turbulence or mixing if desired.

Figure 5:
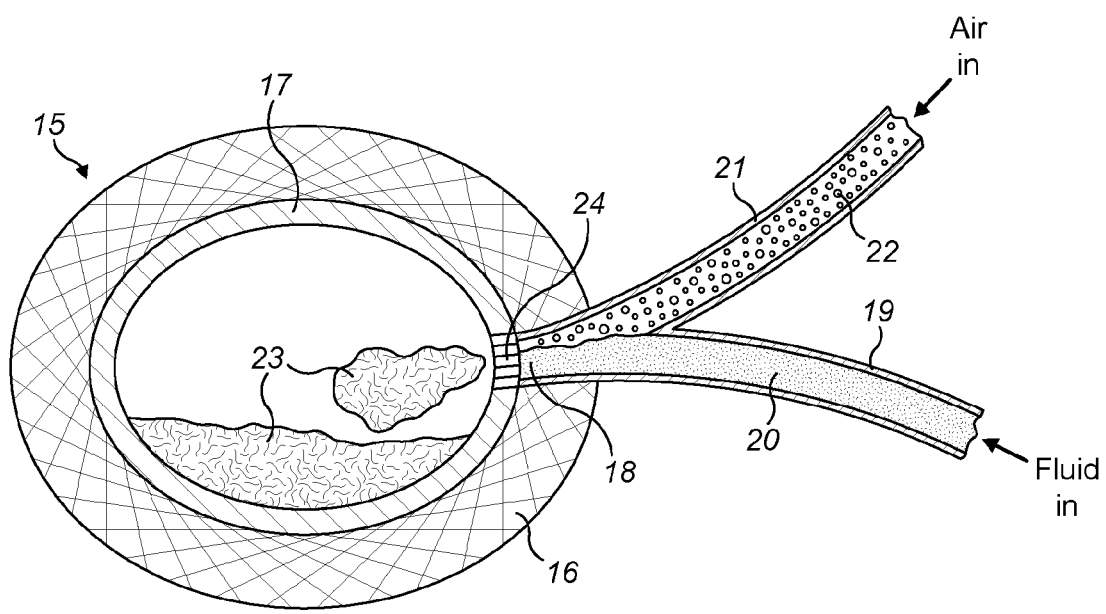

In one exemplary embodiment shown in FIG. 5, an airline 21 is joined to the line supplying the liquid at the point where the fluid line enters the opening in the moulded part. FIG. 5 shows a cut through of a moulded part with the fluid/airline supply attached. Mixing the heated liquid 20 with compressed air 22 results in the liquid becoming aerated as it enters the opening of the moulded part. In this example, the aerated liquid 23 is injected into the inflation aperture 24 of a hollow bladder and into the internal cavity of the bladder.

The liquid and air mixture 23 then deforms the bladder 17 as described above. The mixture is then removed from the hollow cavity of the moulded part as described above.

In a further embodiment, the method may comprise a two-stage process, whereby one fluid, for example hot air, is used to perform a first stage of deforming of the support element material and then a liquid, for example a heated PEG solution, is used to perform a second stage of deforming of the support element and the wash-out of the deformed support element material whilst keeping the material sufficiently warm. The first stage of deforming the support element material may comprise warming the moulded part. The first stage of deforming the support element material may comprise introducing hot air through the opening in the moulded part 15.

The method may further comprise agitating the heated liquid together with the support element to facilitate the heat exchange, support material breakdown and material mix exit flow. This might involve fragmentation of the soft or semi-molten support element into sufficiently small particles that are mixed with the liquid to facilitate flow out through the opening.

The support element could alternatively be a core or a mandrel.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A method for removing a hollow support element from within a moulded part to form a cavity within the moulded part, the hollow support element being an inflatable bladder comprising an internal cavity, the hollow support element being disposed within the moulded part and composed of material having a softening temperature, the material composing the support element comprising a rubber, the method comprising:
   heating a liquid to a temperature at least equal to the softening temperature of the material;
   injecting the heated liquid into an opening in the moulded part to deform the material; and
   removing deformed material and liquid from the cavity.

2. The method of claim 1, wherein injecting the heated liquid into the opening in the moulded part comprises injecting the heated liquid into the internal cavity of the support element through the opening in the moulded part.

3. The method of claim 1, wherein injecting the heated liquid into the opening in the moulded part comprises injecting the heated liquid into the opening such that the heated liquid infiltrates a space between the support element and the moulded part.

4. The method of claim 1, wherein removing the deformed material and liquid from the moulded part comprises removing the deformed material and liquid from the moulded part through the opening.

5. The method of claim 1, wherein deforming the material comprises softening the material.

6. The method of claim 1, wherein the support element is composed of material having a melting temperature, the liquid is heated to a temperature at least equal to the melting temperature of the material and the liquid is injected into the opening in the moulded part to melt the material.

7. The method of claim 6, wherein injecting the heated liquid into the opening in the moulded part comprises injecting the heated liquid into the opening in the moulded part to fully melt the support element.

8. The method of claim 1, further comprising mechanically agitating the support element and the heated liquid inside the moulded part.

9. The method of claim 1, wherein the liquid is polyethylene glycol.

10. The method of claim 1, wherein the liquid is polypropylene glycol.

11. The method of claim 1, wherein the liquid is a mixture of two or more liquids.

12. The method of claim 1, the method comprising mixing the heated liquid with a gas prior to injecting the heated liquid into the opening in the moulded part.

13. The method of claim 1, wherein the material composing the support element comprises two or more material constituents.

14. The method of claim 1, wherein removing deformed material and liquid from moulded part comprises removing substantially all of the deformed material and liquid.

15. The method of claim 1, the method comprising attaching a fluid supply line to the opening of the moulded part, and wherein the injecting the heated liquid is via the fluid supply line.

16. The method of claim 1, wherein injecting the heated liquid into the opening in the moulded part comprises partially or fully immersing the moulded part in a bath of liquid to allow heated liquid to flow into the opening.

17. The method of claim 1, the method comprising introducing a suction line to the opening, and wherein removing the deformed material and liquid comprises using the suction line to suck the deformed material and liquid from the cavity of the moulded part.

18. The method of claim 1, the method comprising, prior to injecting the heated liquid into an opening in the moulded part, heating the moulded part to a temperature at least equal to the softening temperature of the material to deform the material.

19. The method of claim 1, wherein the moulded part is composed of material having a glass transition temperature, and the liquid is heated to a temperature at least equal to the glass transition temperature of the material of the moulded part.

20. A method for removing a hollow support element from within a moulded part to form a cavity within the moulded part, the hollow support element being an inflatable bladder comprising an internal cavity, the hollow support element being disposed within the moulded part and composed of material having a softening temperature, the method comprising:
   heating a liquid to a temperature at least equal to the softening temperature of the material;
   injecting the heated liquid into an opening in the moulded part to deform the material;
   mixing the heated liquid with a gas prior to injecting the heated liquid into the opening in the moulded part; and
   removing deformed material and liquid from the cavity.

21. A method for removing a hollow support element from within a moulded part to form a cavity within the moulded part, the hollow support element being an inflatable bladder comprising an internal cavity, the hollow support element being disposed within the moulded part and composed of material having a softening temperature, the method comprising:
   heating a liquid to a temperature at least equal to the softening temperature of the material;
   injecting the heated liquid into an opening in the moulded part to deform the material;
   removing deformed material and liquid from the cavity; and
   introducing a suction line to the opening, wherein removing the deformed material and liquid comprises using the suction line to suck the deformed material and liquid from the cavity of the moulded part.

* * * * *